(12) United States Patent
Kadah

(10) Patent No.: US 6,369,544 B1
(45) Date of Patent: Apr. 9, 2002

(54) FURNACE AND AIR CONDITIONER BLOWER MOTOR SPEED CONTROL

(76) Inventor: Andrew S. Kadah, 5000 Hennaberry Rd., Manlius, NY (US) 13104

(*) Notice: Subject to any disclaimer, the term of this patent is extended or adjusted under 35 U.S.C. 154(b) by 0 days.

(21) Appl. No.: 09/758,504

(22) Filed: Jan. 12, 2001

(51) Int. Cl.$^7$ .................................................. H02P 1/26
(52) U.S. Cl. ...................... 318/772; 318/779; 236/91 D; 236/DIG. 9
(58) Field of Search ................................. 318/772, 779, 318/801, 806, 434, 461; 236/91 R, 91 D, 91 F, DIG. 9

(56) References Cited

U.S. PATENT DOCUMENTS

| | | | | |
|---|---|---|---|---|
| 4,205,381 A | * | 5/1980 | Games et al. ................. | 364/505 |
| 4,978,896 A | * | 12/1990 | Shah ............................. | 318/254 |
| 5,076,780 A | | 12/1991 | Erdman ........................ | 431/24 |
| 5,197,667 A | * | 3/1993 | Bowsky et al. .............. | 236/49.3 |
| 5,364,026 A | * | 11/1994 | Kundert ...................... | 236/49.3 |
| 5,410,230 A | * | 4/1995 | Bessler et al. ............... | 318/471 |
| 5,592,059 A | * | 1/1997 | Archer ......................... | 318/254 |
| 6,118,239 A | | 9/2000 | Kadah ......................... | 318/268 |
| 6,155,341 A | * | 12/2000 | Thompson et al. ......... | 165/244 |
| 6,172,476 B1 | * | 1/2001 | Tolbert, Jr. et al. ......... | 318/772 |
| 6,282,910 B1 | * | 9/2001 | Helt ............................ | 62/229 |
| 6,295,823 B1 | * | 10/2001 | Odom et al. ................ | 62/176.6 |

* cited by examiner

Primary Examiner—Robert E. Nappi
Assistant Examiner—Rina I. Duda

(57) ABSTRACT

A supplemental circuit board is provided for a furnace and air conditioning system to power the blower motor so that there is normal heat speed during a heat cycle, and normal, full speed when there is a normal cooling cycle. When there is a call for economy, dehumidification, or partial speed cooling, an inverter provides pulsating power for efficient reduced blower speed operation. An actuator circuit provides a blower-motor in-use signal, and a low-speed logic circuit provides a low-speed signal when there is a call for reduced speed cooling. In case of circuit failure, the arrangement defaults to normal speed operation.

14 Claims, 3 Drawing Sheets

FURNACE AND AIR CONDITIONER BLOWER MOTOR SPEED CONTROL

BACKGROUND OF THE INVENTION

The present invention relates to a speed control circuit that controls power to a furnace and air conditioner blower motor, which is typically an AC induction motor. The invention is especially directed to an arrangement for controlling blower motor speed to optimize the air flow into a heated or air conditioned space, with blower speed being at an appropriate speed for heating or air conditioning load. Preferably, the blower is operated in a manner to conserve electrical energy when the blower is operated at a reduced or lower speed, and which will fail-safe so as not to impair the safe pre-set operating speed for a heating mode.

In HVAC systems, such as home air conditioning systems, it is often desirable to change the fan speed or blower speed to control the amount of air flow through the system evaporator coil. Cold, dry air is considerably heavier than warm moist air, and so higher blower speed is needed for air conditioning than is needed for heating. In addition in the initial operation in an air conditioning mode, the blower has to operate at high speed to pump conditioned air, especially to higher floors. Then, when the comfort space or living space has cooled down, the fan speed can be reduced to avoid blowing cold air directly on human occupants. Reduced fan speed can also saves power and hence a reduced speed mode is often referred to as "economy" operation. Also, where sensible cooling is needed, rather than latent cooling (dehumidification) the blower is operated at higher speed to increase air flow. Correspondingly, if dehumidification is required rather than sensible cooling, the air flow rate should be reduced, requiring a slower blower speed. Other air conditioning load considerations can also create air flow requirements to govern blower speed, such as heat and humidity requirements for indoor plants, or preservation of expensive art works or musical instruments. The need for variable speed blower operation is discussed in my U.S. Pat. No. 6,118,239. That patent also discloses in detail a speed control drive circuit design for an inverter for powering the blower motor during a reduced-speed operation.

Blower motors for furnaces are designed with a fixed speed for a heating operation, and this speed is engineered to provide the proper amount of air flow through the furnace heat exchanger when there is flame present. This blower speed should not be changed, and reduced speed operation during heating could create a hazard due to possible overheating of the heat exchanger. On the other hand, the blower motor typically has the capability for higher speed operation during cooling or air conditioning. Conventionally, there is a full speed power input terminal on the blower motor, and a second terminal also, which is used for heating in which the motor operates at a pre-set lower speed. The HVAC furnace board has a thermostat relay that connects to the full speed power input terminal when there is a call for air conditioning, and to the second or heating terminal when there is a call for heat.

While it is highly desirable to provide a reduced speed blower capability for many possible air conditioning situations, it is important that this never interfere with the preestablished blower setting that is used for heating. It is also important that if there is a failure in the control mechanism, that the occupant be able to obtain heat, and if possible to obtain at least full-blower-speed air conditioning as well.

OBJECTS AND SUMMARY OF THE INVENTION

It is an object of this invention to provide a control circuit for an AC blower motor that avoids the drawbacks of the prior art as discussed above.

It is another object to provide a speed control or driver circuit that achieves efficient operation of a blower motor for air conditioning or dehumidification, but without adversely affecting blower operation during heating.

It is a further object to provide a control circuit that is will fail safe, and permit normal heating blower operation and full-speed air conditioning blower operation.

According to an aspect of the invention, a furnace and air conditioner control system involves a supplemental furnace board, i.e., supplemental circuit board or control logic, with circuitry for controlling application of electrical power to an AC blower motor. As discussed, the blower motor can have a cooling full speed power terminal and a heating (reduced speed) power terminal, as well as a common (or neutral) terminal. The blower motor is not necessarily a multi-tap motor, and single-speed motors are sometimes used on low-cost equipment, and the circuit arrangement of this invention can also be used to advantage with such motors. A main furnace board may typically be provided within or adjacent to the furnace/air conditioner assembly, and has a main AC input connected to the "black" or "hot" conductor of a pair of main AC conductors. A "heat" or "furnace" terminal is connected to the heating terminal of the blower motor, and a "cool" or A/C terminal is provided to connection to the cooling full-speed terminal of the motor. Generally, there is a main furnace relay connected to said main AC input, and a heating/air conditioning relay in series with said main relay. The latter has a normally-closed contact connected to the heat terminal and a normally-open contact connected to the cool terminal. There are also input terminals to which various thermostat conductors are attached, and circuitry responsive to thermostat signals e.g. a heat signal, a full speed cooling signal, and a partial speed cooling signal. In a preferred embodiment of the invention, the supplemental circuit board has a cool speed input connected to the above-mentioned cool terminal, a motor 1 terminal connected to the cooling full speed power terminal of the motor, a motor 2 terminal connected to the common terminal of said motor, and a neutral terminal connected to the neutral wire of the main AC conductors.

In order to provide "economy" operation, i.e., variable speed or reduced speed blower operation for air conditioning, a cool speed inverter circuit generates a reduced-speed AC power to operate the blower motor at a reduced speed when there is a call for partial speed cooling. The inverter circuit has first and second AC power inputs and a first power output terminal and a second power output terminal. On the supplemental board a first relay has normally-open contacts connected between the cool speed input and the motor 1 terminal, and normally-closed contacts connected between the first power output terminal of the inverter circuit and the motor 1 terminal. The second power terminal of the inverter is coupled to the motor 2 terminal. Other relay combinations are also possible.

Also, a second relay has normally-closed contacts connected between said motor 2 terminal and the neutral terminal, and normally-open contacts coupled between the neutral terminal and one AC power input of the inverter. The other AC power input of the inverter is coupled to the cool speed input. This second relay can be omitted in some circuit designs, as it serves mainly to prevent the inverter capacitors from overstress during times of normal motor speed operation.

A low-voltage logic circuit with inputs to receive thermostat signals may have an input to receive a blower motor in-use signal and has an output that provides a low-speed cooling signal, the latter being generated, e.g., when there is a call for reduced speed cooling or for dehumidification.

A first actuator circuit coupled to one or both of the cool speed input and the motor 1 terminal and has an actuator, e.g., relay coil, for actuating the first relay when AC electric power is being supplied to the blower motor. This first actuator circuit also generates the blower motor in-use signal when the blower motor is energized. This in-use signal generator can be omitted also, in some circuit designs. A portion of the first actuator circuit may be responsive to the low-speed cooling signal to disable the actuator or relay coil when the low-speed cooling signal is present. There is a second actuator circuit responsive to the low-speed cooling signal for actuating the second relay when said low-speed cooling signal is present.

Blower speed can be selected automatically based on heat or air conditioning load, or can be manually selected by the user, employing a selector or control mechanism which can be in an associated wall thermostat or supplemental input humidistat device. Blower speed can be anywhere in a range from low speed to high speed, or can be at two or more discrete values, e.g., low speed and full speed, or one or more speeds in between. In many cases, the inverter can gradually ramp up blower speed. The low-voltage logic circuitry can be microprocessor based. The inverter circuit can be a full bridge, half bridge, or other arrangement capable of delivering power efficiently to the blower motor for reduced speed operation. PWM drive systems can be employed, if desired.

The above and many other objects, features, and advantages of this invention will become apparent from the ensuing description of a preferred embodiment, which should be read in conjunction with the accompanying Drawing.

BRIEF DESCRIPTION OF THE DRAWING

FIG. 3 is an enlargement of a portion of circuit diagram of FIG. 2.

DETAILED DESCRIPTION OF A PREFERRED EMBODIMENT

Figure 1:
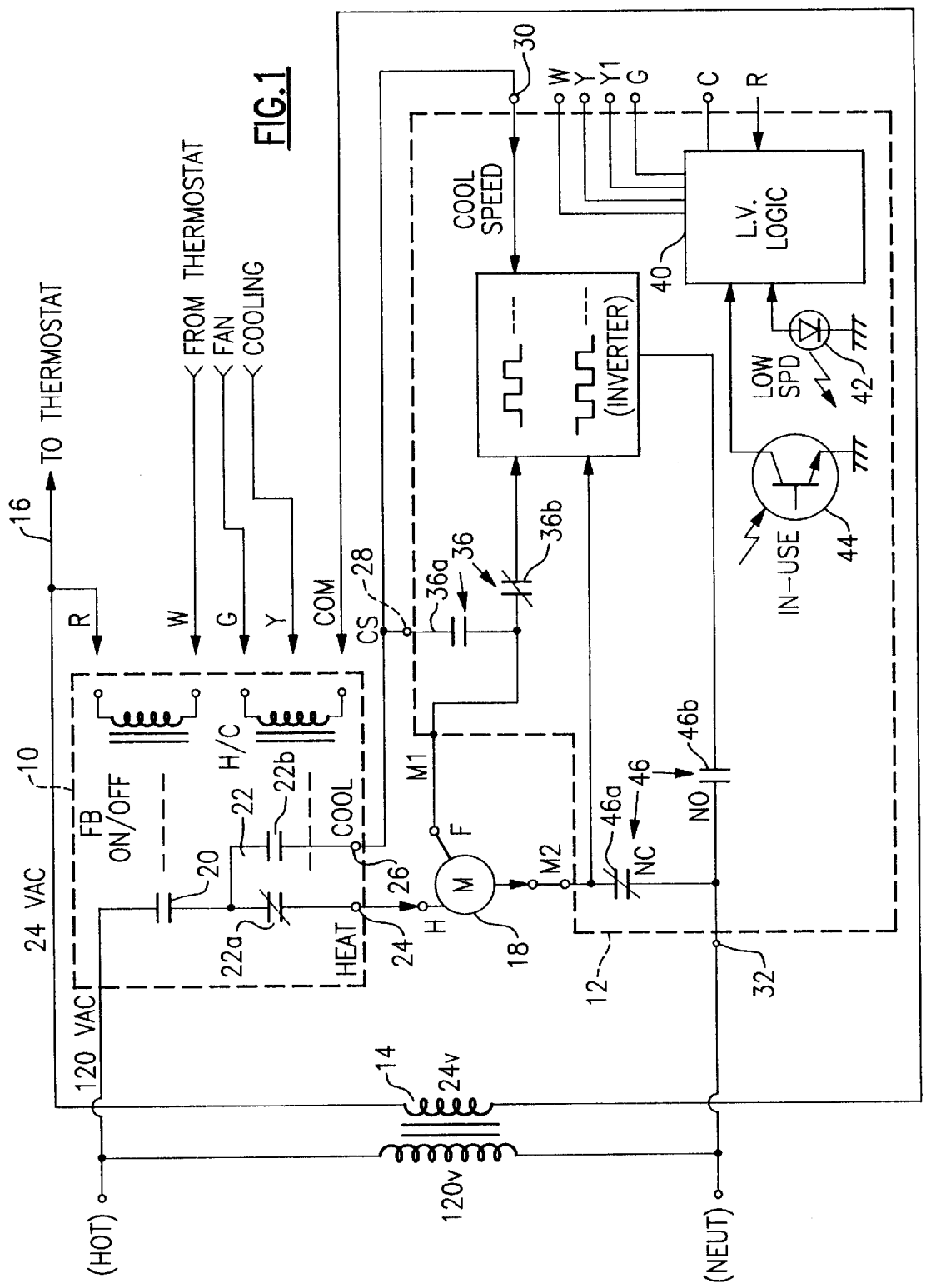
FIG. 1 is a circuit diagram for a heat and air conditioning control and drive circuit for an AC blower motor, according to one possible embodiment of the present invention.

With reference to the Drawing, FIG. 1 is a circuit diagram of an illustrative embodiment of a furnace and air conditioner control system of this invention. Here, the system incorporates a main furnace board 10, shown bordered by a dash line, and a supplemental circuit board 12, also shown within a dash line border. Also shown here are a thermostat transformer 14, with a primary coil connected between a hot conductor and a neutral conductor of the main AC household power (nominally 120 volts) and a secondary coil providing 24 volt transformer power over a thermostat power wire 16, usually having red insulation, i.e., here labeled R. There are other wires returning from the wall thermostat (not shown) including a W (heat), G (fan), Y (partial fan speed cooling), and Y2 (full fan speed cooling). A common wire (COM) returns to the transformer secondary.

A furnace blower motor 18 is illustrated schematically with a heat speed electrode H, a full-speed cooling electrode F, and a common electrode. The motor 18 is designed and engineered so that the when power is applied to the H electrode, it will provide a prescribed air flow through the furnace heat exchanger. The blower motor speed during heating should stay at the prescribed speed for safety reasons. Full speed is used for cooling, i.e., air conditioning. The heating speed is some predetermined fraction of full speed, to accommodate for the lower density of warm heated air as compared with chilled conditioned air.

Within the main furnace board 10 is a main furnace on/off relay 20, followed by a heat/cool relay 22, with normally-closed contacts 22a going to a heat power output 24 and normally-closed contacts 22b going to a cool power output 26. The heat power output 24 is connected to the heat speed electrode H of the motor 18. In some systems, one or the other of the two relays 20, 22 may be omitted or unused.

On the auxiliary or supplemental board 12 the cool power output 26 is connected to a cool speed input 28 and an additional cool speed input 30. A motor power terminal M1 is connected to the full-speed electrode F of the motor 18. A second motor power terminal M2 is connected to the common electrode of the motor, and has internal connections, to be discussed below, to a "neutral" terminal 32, which is connected to the neutral conductor of the AC main power.

An inverter 34, here embodied as a half-bridge inverter, has a power input connected to the cool speed input 30 and a pair of AC output terminals that provide an inverted AC power wave to run the motor 18 at a speed reduced below full speed. A first relay 36 has normally open contacts 36a between the cool speed input 28 and the M1 terminal and normally closed contacts 36b between one inverter output and M1 terminal. The other output of the inverter 34 is directly connected to the M2 terminal.

For a single speed motor (without separate H and F taps) the M1 terminal, cool speed input 28 and heat electrode h would all be connected together, in which case the first relay 36 could be omitted.

A low-voltage logic circuit 40 has thermostat inputs to receive the W, Y, Y2, and G signals, and may contain one or more microprocessors to control air conditioning operations, including time delays and other functionalities. A low-speed output LED 42, which is typically one-half of an optocoupler, is connected to turn on when there is a call for economy operation, dehumidification, or partial-speed cooling (i.e., on Y2). Also shown here is a motor in-use sensor 44 in the form of a phototransistor, which in practice is one-half of another optocoupler. The purpose of the sensor 44 is to signal to the logic circuit when there is power being applied to the motor 18, either during heating or during full-speed cooling. This signal also provides an affirmative confirmation of the end of blower operation, i.e., after a purge following a heating or air conditioning cycle.

Figure 2:
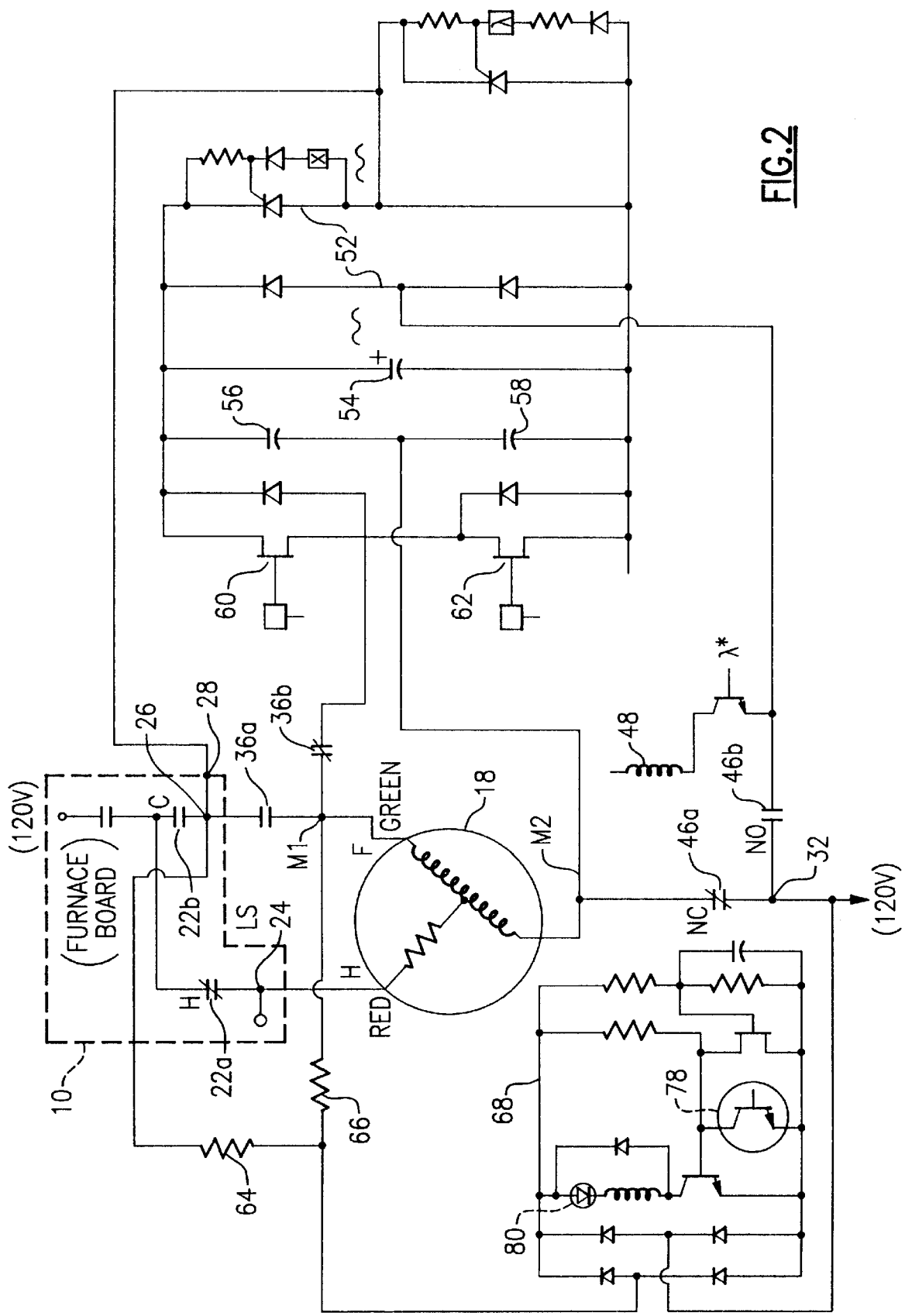
FIG. 2 is another circuit diagram showing details of this embodiment.

Details of the inverter 34 of this embodiment are shown in more detail in FIG. 2. This inverter can operate according to principles disclosed in prior U.S. Pat. No. 6,118,239, although the invention is not limited to the use of that type of inverter. A bridge rectifier 52 has AC inputs connected to the cool speed input 30 and the normally-open relay contacts 46b, and provides a DC rail voltage at a level that is controlled by the low-voltage logic circuit 40. A smoothing capacitor 54 is situated between the positive and negative rails, and the resulting DC power supplies a half-bridge inverter formed of a series pair of capacitors 56 and 58, and a series pair of half-bridge switching transistors 60 and 62. The transistors have associated control circuitry coupled to the low-voltage logic circuit 40 so that the transistors switch on and off at appropriate times depending on the frequency and duty cycle needed for the blower motor 18. These transistors may typically be switching MOSFET transistors. As mentioned before, other types of circuits may be used instead to provide power for economy or reduced speed operation, including full-bridge circuits or pulse-width modulation circuits.

In this embodiment, a relay actuator 48 is associated with the relay 46, and can be optically switched on by means of the low-speed output 42 when there is a call for low-speed cooling.

A first motor-on resistor 64 has one end connected to the cool speed input 28, and a second motor-on resistor 66 has one end connected to the M1 terminal. The other ends of these resistors are joined to one input of a relay actuator circuit 68, a second input of which is coupled to the neutral terminal 32. The relay actuator circuit 68 is shown in enlarged form in FIG. 2A.

The power inputs are joined to an input bridge rectifier 70, supplying DC current to a relay actuator coil 72 that is associated with the first relay 36. The relay coil 72 is in series with a switching transistor 74 and a bias network 76 is joined to the base of the switching transistor 74. The relay actuator circuit normally will switch on to actuate power the coil 72 whenever some minimum threshold voltage appears at either the heat H or normal cool F terminal of the motor 18. This then serves to cut in the relay 36 so that the normally-open contacts 36a close and the normally-open contacts 36b open, providing direct AC power either to the H or to the Fmotor terminal, depending on whether there is a call for heat or a call for cooling.

Figure 2A:
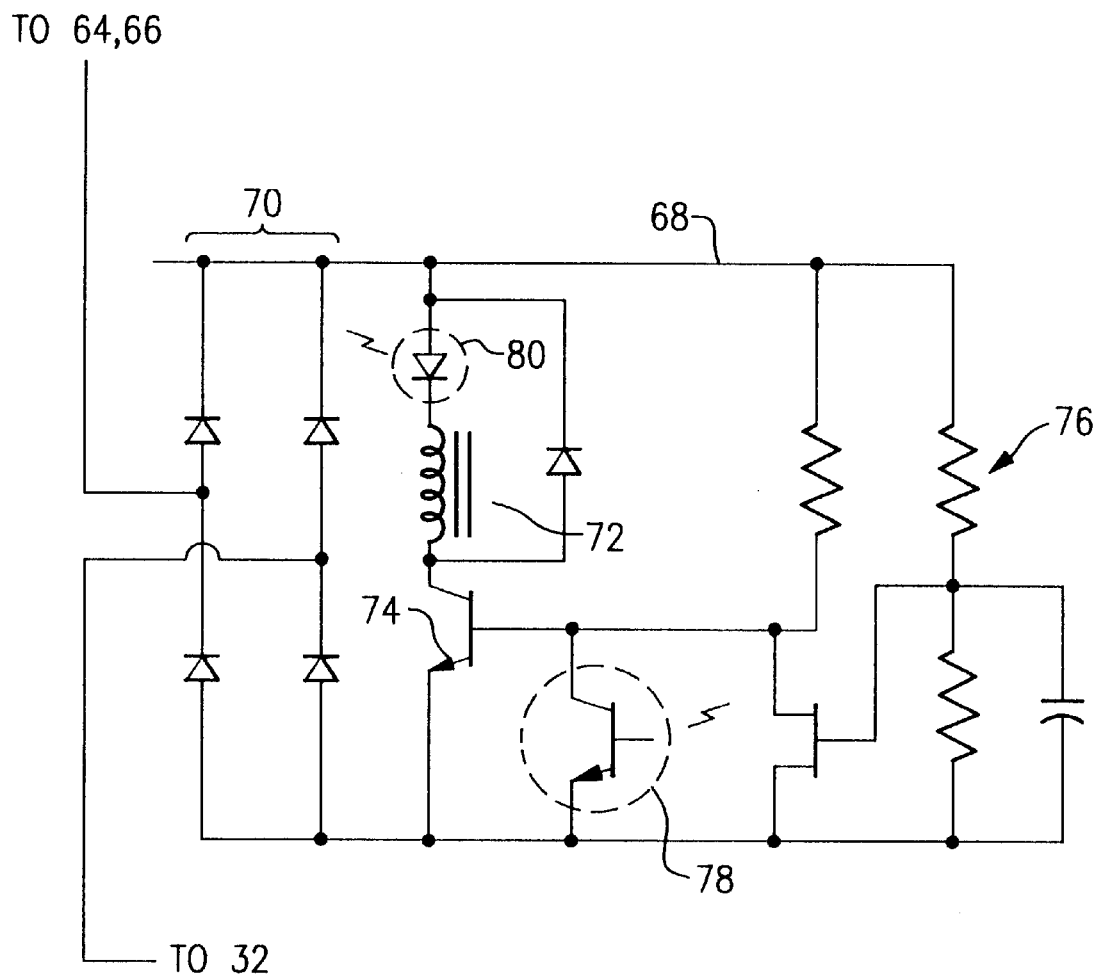

As also shown in FIG. 2A, there is a low-speed cooling switch 78, here in the form of a phototransistor situated between the gate (or base) and the emitter (or source) of the transistor 74. This phototransistor switch 78 is optically coupled to the low-speed output LED 42, and serves to switch off the transistor 74 when there is a call for low-speed cooling, i.e., reduced fan or blower speed. Further shown in FIG. 2A is an in-use indicator, here in the form of an LED 80 that is situated in series with the relay actuator coil 72 and switching transistor 74. This LED 80 is optically coupled to the in-use sensor 44, and lets the low-voltage logic circuit know whenever the motor 18 is being energized, i.e., during a heating cycle, during a normal or full-speed cooling cycle, or during a blower-only cycle. The LED 80 is dark during a low-speed cooling cycle.

The inverter 34 can be adapted to gradually increase the speed of the blower motor 18, i.e., to ramp-up, when air circulation commences, providing additional comfort and quiet to the homeowner. The inverter 34 can also be adapted to drive higher load devices, such as air conditioning compressors, permitting the compressor to operate at variable speeds so that the compressor capacity changes gracefully with the cooling load.

The bridge inverter can be a half-bridge design as shown, with two MOSFET switches, IGBTs, bipolars, or other semiconductor switches, or can be of a full-bridge, four-switch design or of a three-phase, six-switch design. Also, the capacitor 54 can be omitted in some designs.

With the circuits of this invention, power consumption is reduced by increasing efficiency, and by modulating the power at low speeds. The motor speed control arrangement of this invention is retrofittable on existing blower motors, and can be used with typical existing HVAC systems. Blower speed can be adjusted at the thermostat. The inverter drive can result in a 50% reduction in airflow at an 80% savings in energy cost to power the blower. Similar savings are obtained with other load devices.

It should be appreciated that the arrangement according to this invention has a fail-safe characteristic so that it does not affect the blower speed during a heat cycle, and does not affect the application of power to the motor during a normal or full-speed cooling cycle. Whenever there is a call for heat, the furnace relay 22a applies power directly to the H terminal of the motor 18. The common motor terminal is connected through the M2 terminal and the normally-closed relay contacts 46b to the AC neutral conductor. Likewise, whenever there is a call for normal or full-speed cooling, the relay contacts 22b supply AC power to the full-speed cool F terminal of the motor 18, and the motor common terminal is connected through the M2 terminal and the normally-closed relay contacts 46a to the neutral AC conductor. Neither of the heat or full-speed cooling cycles are affected by any failure of the inverter 34, the low-voltage logic circuit 40, the relay 46 or the wiring.

In the case of a call for economy or reduced speed cooling, the logic circuit 40 lights the low-speed output LED 42, which disables the actuator 72 for the first relay 36: normally-open relay contacts 36a present an open circuit to the M1 terminal, and normally closed contacts 36b connect the output or inverter 34 to the M1 terminal. A moment later, the relay 46 is actuated so that the path through the contacts 46a is opened and the path from the common terminal 32 to the inverter power input is completed through the contacts 46b. The inverter then supplies pulsating power between the full-speed cooling F terminal and common terminal of the blower motor 18 to run the blower at a desired air flow speed. As mentioned before, the inverter can be run at variable speeds, and the inverter waveform may be controlled by means of the low-voltage logic circuit 40.

The relay 46 and its actuator 48 can be omitted in some circuit designs. These elements do have a function of protecting the capacitors 54, 56, and 58 of the inverter. It may be observed that if the inverter diode bridge is connected directly to the cool speed terminal 28 and to the neutral terminal 32, there will be power applied through the diode bridge 52 when there is a call for full speed cooling. The capacitors 56 and 58 are charged by the bridge diodes, and the junction between them is connected to the neutral conductor by way of the M2 terminal. This creates a voltage doubler circuit, and imposes a stress on the capacitors. In addition, when there is a call for heat, AC power is applied to the diode bridge through the motor winding and the resistors 64 and 66, also resulting in charging up the capacitors 56 and 58. If more expensive, high voltage tolerant capacitors are used here, which are better able to withstand the voltage stress for extended periods of time, then the second relay 46 can be omitted.

On the other hand, for a circuit board designed for use with a single-speed blower motor, i.e., with only hot and neutral taps and without full and partial speed taps, then the second relay 46 would serve to isolate the output of the inverter 34 from the main AC power, in which case it would be present on the supplemental board 12 and would function as described above.

As mentioned previously, the in-use indicator LED 80 gives an affirmative indication that power is being applied to the motor 18 except when there is a call specifically for low-speed cooling operation. The in-use signal, picked up by the sensor phototransistor 44, can be used within the low-voltage logic circuit 40 for any of a variety of purposes. For example, in a purge cycle, this signal can be used to sense an unknown time delay and confirm that the motor has ceased operation. Also, if going from full-speed cooling to low-speed cooling, the logic circuit 40 can determine that the in-use signal is extinguished, and then can commence use of the inverter 34. This prevents the inverter from being connected when the motor 18 is still turning at full speed, which can present an undesirable back EMF to the inverter. Of course, the absense of an in-use signal during times when the low-voltage logic would expect the blower to be operating could be used to generate a trouble signal so that the homeowner would be alerted and could call a repair technician.

While the invention has been described in detail with reference to certain preferred embodiments, it should be understood that the invention is not limited to those precise embodiments. Rather, many modifications and variations would present themselves to persons skilled in the art without departure from the scope and spirit of the invention, as defined in the appended claims.

I claim:

1. HVAC control system for controlling application of electrical power to an AC blower motor having a cooling full speed power terminal, a heating reduced speed power terminal, and a common terminal, said system including a main furnace control system having a main AC input connected to one conductor of a pair of main AC conductors, a heat terminal connected to the heating terminal of said blower motor, and a cool terminal, a relay arrangement connected to said main AC input, and having a heating/air conditioning relay contacts including a normally closed contact connected to said heat terminal and a normally open contact connected to said cool terminal, and thermostat input means responsive to thermostat control signals which include a heat signal, a full speed cooling signal, and a partial speed cooling signal; and a supplemental circuit arrangement including a cool speed input connected to said cool terminal, a motor 1 terminal connected to the cooling full speed power terminal of said motor, a motor 2 terminal connected to the common terminal of said motor, and a neutral terminal connected to a second one of said pair of main AC conductors;

a cool speed inverter circuit providing a reduced AC power for operating said blower motor at a reduced speed when there is a call for partial speed cooling; said inverter circuit having first and second AC power inputs, a first power output terminal and a second power output terminal;

a first relay having normally-open contacts connected between said cool speed input and said motor 1 terminal, and normally-closed contacts connected between the first power output terminal of said inverter circuit and said motor 1 terminal, said second power terminal being coupled to said motor 2 terminal;

a low-voltage logic circuit having inputs to receive said thermostat signals and having an output that provides a low-speed cooling signal; and a first actuator circuit coupled to one of said cool speed input and said motor 1 terminal and including first actuator means for actuating said first relay when AC electric power is supplied to said motor; and means responsive to said low-speed cooling signal to disable said actuator means when said low-speed cooling signal is present.

2. The HVAC control system according to claim 1 wherein said first actuator circuit has an input coupled to said cool speed input and another input coupled to said motor 1 terminal.

3. The HVAC control system according to claim 2 wherein said first actuator circuit includes a rectifier disposed between said first actuator circuit inputs and said neutral terminal, and DC outputs, and wherein said first actuator means is connected between said DC outputs.

4. The HVAC control system according to claim 1 further comprising a second relay having normally-closed contacts connected between said motor 2 terminal and said neutral terminal, and having normally-open contacts coupled between said neutral terminal and one of the first and second AC power inputs of said inverter, the other AC power input thereof being coupled to said cool speed input.

5. The HVAC control system according to claim 4 further comprising a second actuator circuit responsive to said low-speed cooling signal for actuating said second relay when said low-speed cooling signal is present.

6. The HVAC control system according to claim 5 wherein said first actuator circuit includes means to generate a blower motor in-use signal when said blower motor is energized, and wherein said low-voltage logic circuit has an input to receive said blower motor in-use signal.

7. The HVAC control system according to claim 6 wherein said first actuator means includes a relay coil in series with a switch that is controlled by said low-speed cool signal, and said means to generate said in-use signal includes a photoemitter in series with said relay coil.

8. The HVAC control system according to claim 6 wherein said blower motor in-use signal is an optical signal, and said means to generate said in-use signal includes a photoemitter.

9. A supplemental furnace and air conditioning control circuit arrangement comprising a cool speed input, a motor 1 terminal, a motor 2 terminal, and a neutral terminal;

a cool speed inverter circuit providing a reduced AC power for operating a blower motor at a reduced speed; said inverter circuit having first and second AC power inputs, a first output terminal, and a second power output terminal;

a first relay having normally-open contacts connected between said cool speed input and said motor 1 terminal, and normally-closed contacts connected between the first power output terminal of said inverter circuit and said motor 1 terminal, said second power terminal being coupled to said motor 2 terminal;

a low-voltage logic circuit having inputs to receive thermostat signals including a heat signal, a full-speed cooling signal, and a partial speed cooling signal; and having an output that provides a low-speed cooling signal; and a first actuator circuit coupled to one of said cool speed input and said motor 1 terminal and including first actuator means for actuating said first relay when AC electric power is detected thereon; and means responsive to said low-speed cooling signal to disable said actuator means when said low-speed cooling signal is present.

10. A supplemental furnace and air conditioning control circuit arrangement according to claim 9, further comprising a second relay having normally-closed contacts connected between said motor 2 terminal and said neutral terminal, and having normally-open contacts coupled between said neutral terminal and one of the first and second AC power inputs of said inverter, the other AC power input thereof being coupled to said cool speed input; and a second actuator circuit responsive to said low-speed cooling signal for actuating said second relay when said low-speed cooling signal is present.

11. A supplemental furnace and air conditioning control circuit arrangement according to claim 9, further comprising means to generate a blower motor in-use signal when said AC electric power is detected to be supplied to said blower motor, and wherein said low voltage logic circuit has an input to receive said blower motor in-use signal.

12. HVAC control system for controlling application of electrical power to an AC blower motor having a first power terminal and a common terminal, said system including a main furnace control system having a main AC input connected to one conductor of a pair of main AC conductors, a heat terminal connected to the power terminal of said blower motor, and a cool terminal, a relay arrangement connected to said main AC input, and having a heating/air conditioning relay contacts including a normally closed contact connected to said heat terminal and a normally open contact connected to said cool terminal, and thermostat input means responsive to thermostat control signals which include a heat signal, a full speed cooling signal, and a partial speed cooling signal; and a supplemental circuit arrangement including a cool speed input connected to said cool terminal, a motor 1 terminal connected to the power terminal of said motor, a motor 2 terminal connected to the common terminal of said motor, and a neutral terminal connected to a second one of said pair of main AC conductors;

a cool speed inverter circuit providing a reduced AC power for operating said blower motor at a reduced speed when there is a call for partial speed cooling; said inverter circuit having first and second AC power inputs, a first power output terminal and a second power output terminal;

means connected between said cool speed input and said motor 1 terminal and a first power output terminal of said inverter circuit;

a low-voltage logic circuit having inputs to receive said thermostat signals and having an output that provides a low-speed cooling signal; and a relay having normally-closed contacts connected between said motor 2 terminal and said neutral terminal, and having normally-open contacts coupled between said neutral terminal and one of the first and second AC power inputs of said inverter, the other AC power input thereof being coupled to said cool speed input.

13. The HVAC control system according to claim 12 further comprising actuator circuit means responsive to said low-speed cooling signal for actuating said second relay when said low-speed cooling signal is present.

14. The HVAC control system according to claim 13 wherein said output of said low-voltage logic circuit comprises a photoemitter, and said actuator circuit means includes a photodetector optically coupled to said photoemitter.

* * * * *